US011915251B2

(12) United States Patent
Tutuk et al.

(10) Patent No.: US 11,915,251 B2
(45) Date of Patent: Feb. 27, 2024

(54) CONVERSATIONAL ANALYTICS

(71) Applicant: QlikTech International AB, Lund (SE)

(72) Inventors: Elif Tutuk, Lund (SE); Bill Kehoe, Lund (SE); Vesna Brown, Manotick (CA)

(73) Assignee: QlikTech International AB, Lund (SE)

( * ) Notice: Subject to any disclaimer, the term of this patent is extended or adjusted under 35 U.S.C. 154(b) by 0 days.

(21) Appl. No.: 16/574,790

(22) Filed: Sep. 18, 2019

(65) Prior Publication Data

US 2020/0090189 A1 Mar. 19, 2020

Related U.S. Application Data

(60) Provisional application No. 62/733,078, filed on Sep. 18, 2018.

(51) Int. Cl.
*G06Q 30/0201* (2023.01)
*G06F 16/2457* (2019.01)
*G06F 16/248* (2019.01)
*G06F 40/30* (2020.01)

(52) U.S. Cl.
CPC ....... *G06Q 30/0201* (2013.01); *G06F 16/248* (2019.01); *G06F 16/24578* (2019.01); *G06F 40/30* (2020.01)

(58) Field of Classification Search
CPC .................................................. G06Q 30/0201
See application file for complete search history.

(56) References Cited

U.S. PATENT DOCUMENTS

| 8,244,741 | B2 * | 8/2012 | Wolge ............... G06F 16/24539 |
| | | | 707/751 |
| 9,070,087 | B2 * | 6/2015 | Hatami-Hanza ........ G06N 5/02 |
| 10,607,141 | B2 * | 3/2020 | Jerram ..................... G10L 13/00 |
| 10,678,860 | B1 * | 6/2020 | Duffield .............. G06F 16/2456 |
| 10,762,581 | B1 * | 9/2020 | Dutt ........................ H04L 51/02 |
| 2008/0306899 | A1 * | 12/2008 | Gregory ................ G06F 16/345 |
| 2012/0260263 | A1 * | 10/2012 | Edoja ................... G06F 16/958 |
| | | | 719/313 |
| 2013/0268260 | A1 * | 10/2013 | Lundberg ................ G06F 40/40 |
| | | | 704/8 |

(Continued)

FOREIGN PATENT DOCUMENTS

WO WO-2016/174682 A1 11/2016

OTHER PUBLICATIONS

Davide Falessi et al., A Comprehensive Characterization of NLP Techniques for Identifying Equivalent Requirements, ESEM'10, Sep. 16-17, 2010, Bolzano-Bozen, Italy (Year: 2010).*

(Continued)

*Primary Examiner* — Andre D Boyce
(74) *Attorney, Agent, or Firm* — Ballard Spahr LLP

(57) ABSTRACT

Natural language can be used to conduct a conversation that yields analytic results. An interactive user interface can present suggestive content associated with a natural language input to a user. The suggestive content can guide assist the user in obtaining analytic data/information relating to a business, industry, and/or the like. An ontology comprising one or more content items associated with the natural language input can generated. The ontology can be represented as and/or associated with a data structure that temporal correlates a plurality of content items to the natural language input.

20 Claims, 11 Drawing Sheets

(56) References Cited

U.S. PATENT DOCUMENTS

| | | | |
|---|---|---|---|
| 2018/0113854 A1* | 4/2018 | Vig | G06F 40/35 |
| 2018/0144064 A1 | 5/2018 | Krasadakis | |
| 2018/0225608 A9 | 8/2018 | Smith et al. | |
| 2018/0330248 A1* | 11/2018 | Burhanuddin | G06N 20/10 |
| 2019/0042988 A1* | 2/2019 | Brown | G06F 16/9535 |
| 2019/0188251 A1* | 6/2019 | Liu | G06F 40/274 |
| 2019/0205726 A1* | 7/2019 | Khabiri | G06F 16/243 |
| 2019/0392285 A1* | 12/2019 | Manaharlal Kakkad | G06F 40/30 |

OTHER PUBLICATIONS

U.S. Appl. No. 62/733,078, filed Sep. 18, 2018, Elif Tutuk.
Vidya Setlur et al: "Eviza", User Interface Software and Technology, (2016), pp. 365-377.
European Search Report and Written Opinion dated Dec. 17, 2019 by the European Patent Office for EP Application No. 19197791.7, (Applicant—QlikTech International AB) (11 Pages).

* cited by examiner

CONVERSATIONAL ANALYTICS

CROSS-REFERENCE TO RELATED PATENT APPLICATION

This application claims priority to U.S. Provisional Application No. 62/733,078, which was filed on Sep. 18, 2018, and is herein incorporated by reference in its entirety.

BACKGROUND

Analytic systems are used by companies to make data-driven decisions. Traditional systems are purpose-built for a specific business need and are unable to automatically derive and evolve ontologies from disparate systems, applications and/or content sources. For example, an airline flight reservation system can understand concepts associated with airlines, flight reservations, flight destinations, and the like, but cannot automatically expand its domain of understanding to process information associated with hotel reservations, car rentals, or train reservations.

SUMMARY

It is to be understood that both the following general description and the following detailed description are exemplary and explanatory only and are not restrictive. Methods and systems for conversational analytics are described. A computing device can comprise an interface (e.g., a user interface, a graphical user interface (GUI), etc.) that enables natural language input to be processed to provide a user with an interactive conversational and visual information management experience. The computing device can understand an analysis intent of a user and guide the user in the retrieval and management of content items. For example, the computing device can associate a natural language input with a content item (e.g., a response, analytic information, etc.) and a plurality of additional content items (e.g., related analytic information, supplementary data, business concepts, etc.). The computing device can determine if data/information necessary to provide a content item (e.g., a response, analytic information, etc.) responsive to a natural language input is available. If the data/information is unavailable, the data/information can be requested and/or retrieved from a plurality of content sources.

The computing device can provide the user the content item (e.g., response, analytic information, etc.) responsive to the natural language input and also provide the user with a plurality of additional content items that are associated with the content item. For example, the user can use the GUI to provide the natural language input, "What do you know about sales?" The computing device can determine a plurality of terms and/or phrases associated with the keyword "sales," such as "leads", "sales pipeline," "sale opportunities," "deals," and the like. The computing device, based on the plurality of terms and/or phrases, can provide an output (e.g., natural language output, etc.), such as "I can tell you about leads, sales pipeline, sales opportunities, closed deals and sales targets." The computing device can retrieve a stored content item (e.g., stored information, etc.) associated with the plurality of terms and/or can request a plurality of content items associated with the plurality of terms from one or more content sources.

The computing device can generate an ontology comprising the returned content item (e.g., a response, analytic information, etc.) and/or the plurality of content items (additional content items). The ontology can be represented as and/or associated with a data structure that correlates the returned content item and each content item of the plurality of content items to the natural language input. For example, the data structure can be visualized and/or displayed in a manner that illustrates the correlation (e.g., historical correlation, logical correlation, etc.) between the returned content item and each content item of the plurality of content items to the natural language input.

Additional natural language inputs comprising one or more keywords associated with the natural language input can be processed in the same manner as described. The computing device can generate additional data structures. For example, for each natural language input of the additional natural language inputs, the computing device can generate an additional data structure. The data structure and the additional data structures can be stored, displayed, grouped and/or associated with each other based on the keyword. The data structure and the additional data structures can be stored, displayed, grouped and/or associated with each other based on a temporal relationship, such as a time of creation, a frequency of occurrence, and/or the like. The data structure and the additional data structures can be stored, displayed, grouped and/or associated with each other based on any relationship, property, or the like.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
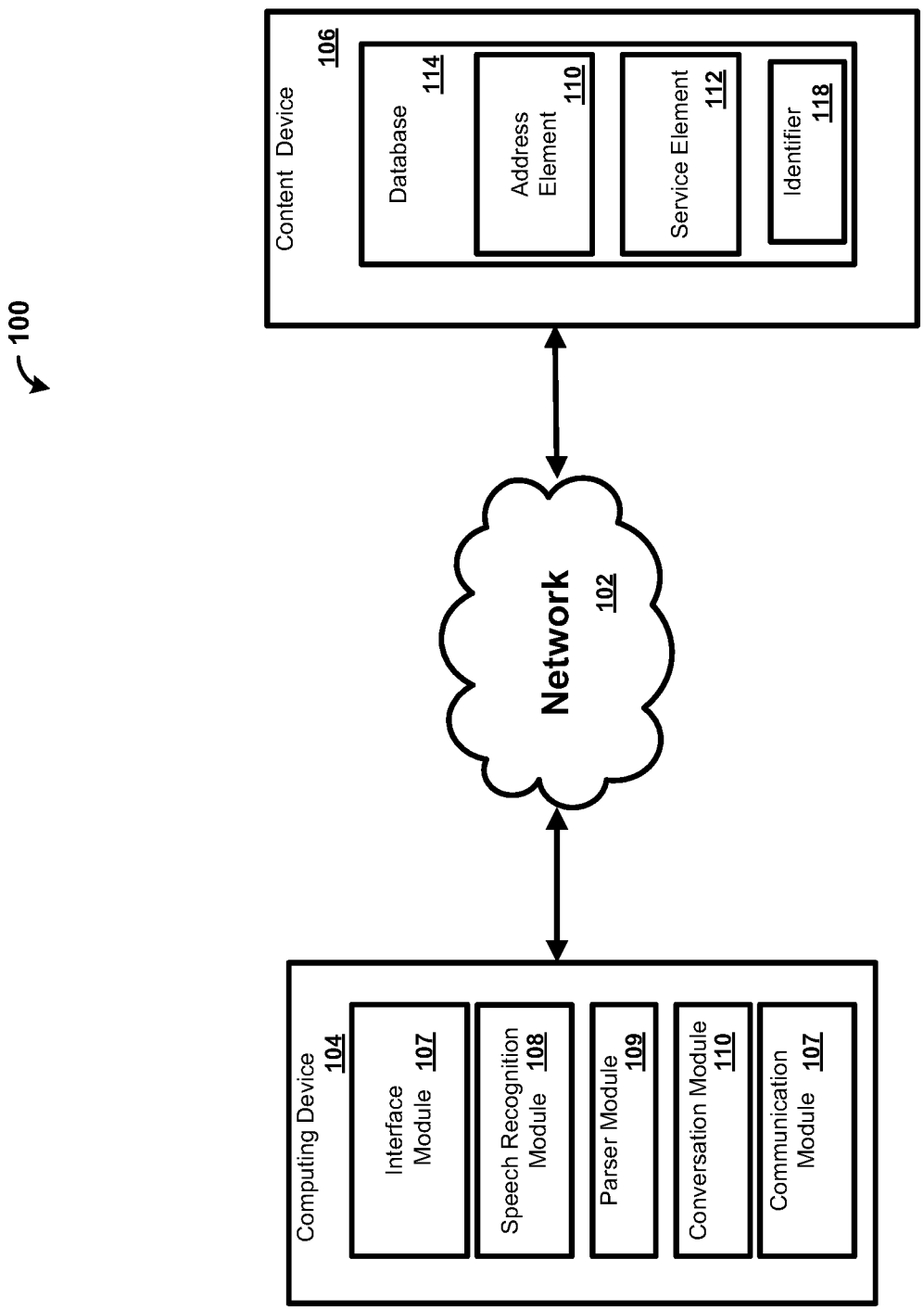
FIG. 1 shows a system for conversational analytics.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.7PG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Conversational analytics is described herein. A user can use an interface to for intelligent analytics and dialog management. The user can be guided by a system that can determine an intent (e.g., an analysis intent, etc.) of the user and provide intelligent feedback during an analytic conversation. The analytic conversation can be stored, visualized, and manipulated by the user.

An analytic conversation and/or the like may be facilitated via a user interface. A computing device can comprise an interface (e.g., a user interface, a graphical user interface (GUI), etc.) that enables natural language input (e.g., speech, text, etc.) to be processed to yield both resultant and suggestive content. To provide resultant and suggestive content, the computing device can analyze the natural language input to determine one or more keywords, determine commonly and/or frequently used terms associated with the one or more keywords, suggest content relevant to the one or more keywords, and access a plurality of content sources to request/retrieve content items relevant to the one or more keywords and/or the intent of the user. For example, a user, via the GUI, can ask (provide and input), "What do you know about sales?" The computing device can determine that "sales" is a keyword. The computing device can determine synonyms of terms related to the keyword "sales," such as "leads," "deals," and/or the like. The computing device can determine one or more topics frequently associated with the keyword "sales," such as, "What is a sales lead," "What is a sales pipeline," "Show me closed deals," and/or the like. The user can be provided a response of, "I can tell you about leads, sales pipeline, sales opportunities, closed deals and sales targets." Each of the topics listed (e.g., leads, sales pipeline, sales opportunities, closed deals, target sales, etc.) can be associated with resultant content (e.g., information, analytic data, business centric information, etc.). The user can also be provided a response that indicates suggestive content, such as "Would you like to learn more about industry sales for the last three years?"

The computing device can determine when content requested via a natural language input is unavailable and can retrieve the requested content from a content source. For example, the user, via the GUI, can ask, "Show sales by product category?" The computing device can determine that such information is unavailable (e.g., not in available storage, not configured/accessible via one or more applications, etc.), and the user can be provided a response of, "I cannot answer your question." The user can then instruct the computing device to obtain the information from one or more content sources (e.g., databases, online sources, business entities, applications, etc.). To analyze and/or interpret content from the one or more content sources, the computing device can translate content (e.g., content items, data, information, etc.) from disparate sources and in various formats to a uniform model.

The computing device can generate an ontology comprising the determined content item (e.g., a response, analytic information, etc.) and/or the plurality of content items (additional content items, analytically related content items, supplementary data, business concepts, etc.). The ontology can be represented as and/or associated with a data structure that correlates the returned content item and each content item of the plurality of content items to the natural language input. The data structure can be visualized and/or displayed in a manner that illustrates the correlation (e.g., temporal correlation, logical correlation, etc.) between the returned content item and each content item of the plurality of content items to the natural language input.

Additional natural language inputs comprising one or more keywords associated with the natural language input can be processed in the same manner as described. The computing device can generate additional data structures. For example, for each natural language input of the additional natural language inputs, the computing device can generate an additional data structure. The data structure and the additional data structures can be stored, displayed, grouped and/or associated with each other based on the keyword. The data structure and the additional data structures can be stored, displayed, grouped and/or associated with each other based on a temporal relationship, such as a time of creation, a frequency of occurrence, and/or the like. The data structure and the additional data structures can be stored, displayed, grouped and/or associated with each other based on any relationship, property, or the like.

FIG. 1 shows a system 100 for conversational analytics. One skilled in the art will appreciate that provided herein is a functional description and that the respective functions may be performed by software, hardware, or a combination of software and hardware.

The system 100 may comprise a network 102. The network 102 may comprise a packet switched network (e.g., interne protocol based network), a non-packet switched network (e.g., quadrature amplitude modulation based network), and/or the like. The network 102 may comprise network adapters, switches, routers, modems, and the like connected through wireless links (e.g., radio frequency, satellite) and/or physical links (e.g., fiber optic cable, coaxial cable, Ethernet cable, or a combination thereof). The network 102 may comprise public networks, private networks, wide area networks (e.g., Internet), local area networks, and/or the like. The network 102 may comprise a content access network, content distribution network, and/or the like. The network 102 may be configured to provide content from a variety of sources using a variety of network paths, protocols, devices, and/or the like. The content delivery network and/or content access network may be managed (e.g., deployed, serviced) by a content provider, a service provider, and/or the like. The network 102 may be configured to provide communication from telephone, cellular, modem, and/or other electronic devices to and throughout the system 100. The network 102 may be configured to be in communication with one or more of a computing device 104, content device 106, and/or the like.

The system 100 may comprise a computing device 104. The computing device 104 may be configured to provide content (e.g., information, analytic data, business centric information, etc.), applications, and/or the like to one or more users. The computing device 104 may comprise a computer, a smart device, a laptop, a tablet, a display device (e.g., television, monitor), and/or the like.

The computing device 104 may comprise an interface module 107 configured to provide an interface to a user to interact with the computing device 104 and/or remote devices, such as the content device 106. The interface module 107 may be any interface for receiving information (e.g., a natural language input, a query, a request for analytical data, etc.) and/or presenting information (e.g., information, analytic data, business centric information, a visual data structure, a conversation history, etc.) to/from a user.

The interface module may receive a natural language input (e.g., a voice input) based on a user speaking within proximity (e.g., near, close to, etc.) of the computing device 104. The interface module 107 may comprise of one or more microphones, speakers, combinations thereof, and the like. The one or more microphones, speakers, combinations thereof, and the like may receive the natural language input from the user. For example, a user, via interface module 107, can ask (provide and input) the computing device 104, "What do you know about sales?" The interface module 107 may receive a natural language input (or a plurality of natural language inputs) by other means. The interface module 107 may receive a natural language input (or a plurality of natural language inputs) via a data transfer, a download, a content source, a network, and/or the like. The interface module 107 may receive a natural language input (or a plurality of natural language inputs) by/based on any suitable method.

The interface module 107 may provide the natural language input (or a plurality of natural language inputs) to a speech recognition module 108. The speech recognition module 108 may process the natural language input (e.g., voice input). The speech recognition module 108 may perform speech-to-text operations that translate the natural language input (e.g., voice input) to text, a plurality of characters, and/or the like. For example, the speech recognition module 108 can process the input "What do you know about sales?" and convert the input to text that can be processed further by the computing device 104. The speech recognition module 108 may provide the natural language input and/or related word/plurality of words to a parser module 109.

The parser module 109 can produce a fully-parsed output (e.g., a parse tree) of the natural language input to determine one or more keywords. For example, the parser module 109 may parse the natural language input and/or related word/plurality of words (e.g., text, a sentence, a phrase, etc.) to determine syntactic and semantic information. The natural language input may be analyzed based on syntactic properties and hierarchical order (e.g., based on a root word/phrase, etc.) to determine a keyword(s). For example, the natural language input, "What do you know about sales," can be parsed to determine the term "sales" as a keyword.

A parsed natural language input and/or keywords can be provided to a conversation module 110. The conversation module 110 can associated a fully-parsed output (e.g., a parse tree) of a natural language input and/or the keywords to a set of possible frequently provided natural language inputs. For example, a natural language input, "Show me sales for last quarter," can be parsed to determine the term "show" as a keyword. The conversation module 110 can correlate the keyword "show" with a group of possible natural language inputs comprising the term "show." As another example, a natural language input, "What do you know about sales," can be parsed to determine the term "sales" as a keyword. The conversation module 110 can determine synonyms of terms related to the keyword "sales," such as "leads," "deals," and/or the like. The conversation module 110 can determine one or more topics frequently associated with the keyword "sales."

The conversation module 110 can track/store information associated with a natural language input, such as a state of the conversation (analytic conversation). For example, the conversation module 110 can track/store natural language inputs and resultant content (e.g., information, analytic data, business centric information, etc.). The user can, based on the conversation module 110, recall, view, and manipulate each natural language input and resultant content processed by the computing device 104. For example, the conversation module 110 can track/store information associated with the natural language input, "Show me sales pipeline by sales representative for the current quarter for the EMEA region." The input can be processed by the interface module 107, the speech recognition module 108, and the parser module 109 as described, and resultant content can be provided to a user. For example, a natural language output, "Here is a bar chart showing sales pipeline for Q3'18 by sales representative for the EMEA region," and the natural language output can be associated with additional resultant content, such as a chart, graph, and/or the like. The conversation module 110 can track/store the resultant content and topic (e.g., sales pipeline by sales representative). The conversation module 110 can use the tracked/stored resultant content and related topic to provide additional content and/or feedback to the user. For example, the user can provide another natural language input, "break that down by industry." The conversation module 110, based on tracking/storing the resultant content and topic, can understand that the additional natural language input corresponds and/or is associated with the resultant content and/or topic previously provided to the user. The computing device 104 can provide/present (via the interface module 107) a natural language output, "Here is a stacked bar chart showing EMEA region sales pipeline for Q3'18 by sales representative broken down by industry." The natural language output can be accompanied with a content item (e.g., a bar chart, etc.) retrieved/requested from storage (e.g., the storage module 112, etc.).

The interface module 107 can provide/present the one or more topics frequently associated with a keyword to the user. As previously described, the keyword can be determined from a natural language input. The interface module 107 can provide/present the one or more topics frequently associated with the keyword to the user via a natural language output and/or display. The conversation module 110 can determine synonyms of and terms related to the keyword "sales," such as "leads," "deals," and/or the like. For example, the conversation module 110 can determine one or more topics frequently associated with the keyword "sales," such as, "What is a sales lead," "What is a sales pipeline," "Show me closed deals," and/or the like. The one or more topics frequently associated with the keyword can be provided to the user. For example, the user can be provided a response of, "I can tell you about leads, sales pipeline, sales opportunities, closed deals and sales targets." The one or more topics frequently associated with the keyword can be provided to the user and the user can select one or more topics for further processing/analysis. Each topic of the one or more topics and/or keyword synonym (e.g., leads, sales pipeline, sales opportunities, closed deals, target sales, etc.) can be associated with resultant content (e.g., information, analytic data, business centric information, etc.). Additionally, the user can also be provided a response that indicates suggestive content, such as "Would you like to learn more about industry sales for the last three years?"

The user can select and/or confirm which topic of the one or more topics frequently associated with the keyword that best represents an intent of the user when the natural language input was provided to the computing device 104. Selecting and/or confirming a topic can cause the computing device 104 to retrieve resultant content, such as one or more content items (e.g., information, analytic data, business centric information, etc.) associated with the topic.

The conversation module 110 may retrieve resultant content, such as one or more content items (e.g., information, analytic data, business centric information, etc.) associated with the topic from a storage module 112. The storage module 112 may store any content, content item, information/data, and/or the like. The computing device 104 can determine when content (e.g., resultant content, a response, answer, etc.) requested via a natural language input is unavailable (e.g., not in storage, not configured with an application, etc.). The computing device 104 can and can retrieve content (e.g., resultant content, a response, answer, etc.) that is unavailable (e.g., not in storage, not configured with an application, etc.) from one or more content sources (e.g., databases, online sources, business entities, applications, etc.). For example, a user can provide a natural language input, "Show sales by product category?" The computing device 104 can process the natural language input as previously described and determine that content (e.g., resultant content, a response, answer, etc.) is unavailable (e.g., not in available storage, not configured/accessible via one or more applications, etc.), and the user can be provided (via the interface module 107) a response of, "I cannot answer your question." The user can instruct the computing device 104 to obtain the content (e.g., resultant content, a response, answer, etc.) from one or more content sources (e.g., databases, online sources, business entities, applications, etc.).

The computing device 104 can comprise a communications module 111. The communication module 111 may retrieve resultant content, such as one or more content items (e.g., information, analytic data, business centric information, etc.) associated with a natural language input from one or more content sources (e.g., databases, online sources, business entities, applications, etc.). The communication module 111 may request or query various files from a local source and/or a remote source, such as a content device 106. The system 100 can comprise a one or more content devices 106. The communication module 111 may comprise hardware and/or software to facilitate communication. The communication module 111 may comprise one or more of a modem, transceiver (e.g., wireless transceiver)), digital-to-analog converter, analog-to-digital converter, encoder, decoder, modulator, demodulator, tuner (e.g., QAM tuner, QPSK tuner), and/or the like.

The computing device 104 can use the communication module 111 to establish a communication session with one or more content sources to retrieve/request resultant content, such as one or more content items (e.g., information, analytic data, business centric information, etc.) associated with a natural language input. The computing device 104 can use the communication module 111 to establish a communication session with the content device 106 based on a short-range communication technique (e.g., Bluetooth, near-field communication, infrared, etc.) via the network 102. The computing device 104 can use the communication module 111 to establish a communication session with the content device 106 based on a long-range communication technique (e.g., a Wi-Fi signal, a wireless signal, an Internet message, an automated phone call, a SMS message, etc.) via the network 102. The computing device 104 may establish a communication session with the content device 106 based on any suitable means/method (e.g., an application program interface (API), etc.).

The computing device 104 can comprise a translation module 113. To analyze and/or interpret content (e.g., resultant content, a response, answer, etc.) from the one or more content sources (e.g., the content device 106) the translation module 113 can translate content (e.g., content items, data, information, etc.) from disparate sources and in various formats to a uniform model. For example, each content source can provide content items based on a specific data model comprising tables and fields and associations formed by special "key" fields shared across two or more tables. For example, tables and fields can be used to represent a business entity, content associated with a business entity, or some facet thereof. Fields within business entity tables and the associations between the business entity tables (direct or indirect) can dictate what and how content is shared between one or more content sources (e.g., the content device 106). A content source can comprise a database that stores content/content items in specific fields, tables, and/or the like. The translation module 113 can identify common value domains such as location, time and contact info (e.g. phone or e-mail) that may be shared by one or more content sources and use the common value domains to translate content/content items to a uniform data model. Content (e.g., resultant content, a response, answer, etc.) and content items (e.g., databases, online sources, business entities, applications, etc.) that has been translated to a uniform data model can be provided to the user via the interface module 107.

The computing device 104 can generate an ontology comprising content (e.g., resultant content, a response, answer, etc.) and a plurality of content items (e.g., databases, online sources, business entities, applications, etc.). The content and/or the content items can be analytically related. The ontology can be represented as and/or associated with a data structure that correlates the content and/or each content item of the plurality of content items to the natural language input. The data structure can be visualized and/or displayed in a manner that illustrates the correlation (e.g., temporal correlation, logical correlation, etc.) between the returned content item and each content item of the plurality of content items to the natural language input. For example, the data structure can display the content and/or each content item of the plurality of content items based on how and/or when they are determined by the content device 104.

The content device 106 may comprise a database 114. The database 114 can comprise content (e.g., resultant content, a response, answer, etc.) and a plurality of content items (e.g., databases, online sources, business entities, applications, etc.). The database 114 can store any type of content, data, and/or information.

The content device 106 may be associated with an identifier 118. The identifier 118 may be any identifier, token, character, string, or the like, for differentiating one content device from another content device. The identifier 118 may identify a content device 106 as belonging to a particular class of content devices. The identifier 118 may comprise information relating to the content device such as a manufacturer, a model or type of device, a service provider associated with the content device 106, a state of the content device 106, a locator, and/or a label or classifier. Other information may be represented by the identifier 118.

The identifier 118 may comprise an address element 110 and a service element 112. The address element 110 may comprise or provide an internet protocol address, a network address, a media access control (MAC) address, an Internet address, or the like. The address element 110 may be relied upon to establish a communication session between the content device 106 and the computing device 104 or other devices and/or networks. The address element 110 may be used as an identifier or locator of the content device 106. The address element 110 may be persistent for a particular network.

The service element 112 may comprise an identification of a service provider associated with the content device 106 and/or with the class of content device 106. The class of the content device 106 may be related to a type of device, capability of device, type of service being provided, and/or a level of service (e.g., business class, service tier, service package, etc.). The service element 112 may comprise information relating to or provided by a communication service provider (e.g., Internet service provider) that is providing or enabling data flow such as communication services to the computing device 104. The service element 112 may comprise information relating to a preferred service provider for one or more particular services relating to the content device 106. The address element 110 may be used to identify or retrieve data from the service element 112, or vice-versa. The one or more of the address element 110 and the service element 112 may be stored remotely from the content device 106 and retrieved by one or more devices such as the content device 106 and the computing device 104. Other information may be represented by the service element 112.

Figure 2:
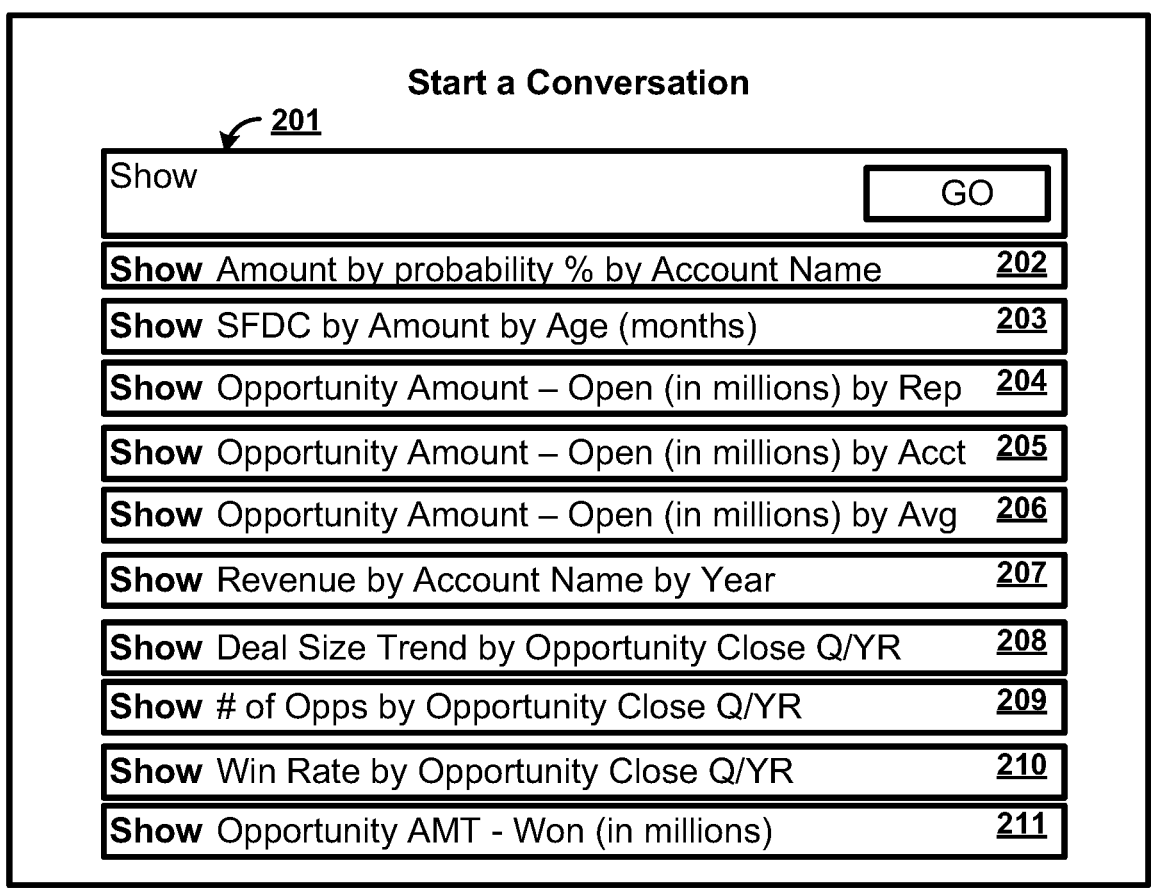
FIG. 2 shows an interface for conversational analytics.

FIG. 2 illustrates an example interface for conversational analytics. A user can conduct a conversation, such as an analytic content discovery conversation, with an interface. The interface 200 can provide/present the one or more topics frequently associated with a keyword to the user. A keyword can be determined from a natural language input and/or provided directly to the interface. For example, a keyword 201 "show" can be provided to the interface 200. The interface can provide/present the one or more topics 202, 203, 204, 205, 206, 207, 208, 209, 210, 211 frequently associated with the keyword 201. A user can select and/or confirm which of the topics 202, 203, 204, 205, 206, 207, 208, 209, 210, 211 associated with the keyword 201 that best represents an intent of the user. For example, topic 205 "Show opportunity amount" can be selected by the user. Selecting and/or confirming a topic can cause content associated with the topic to be retrieved. The conversation can be saved in whole or in part and retrieved/viewed by the user at a later time.

Figure 3:
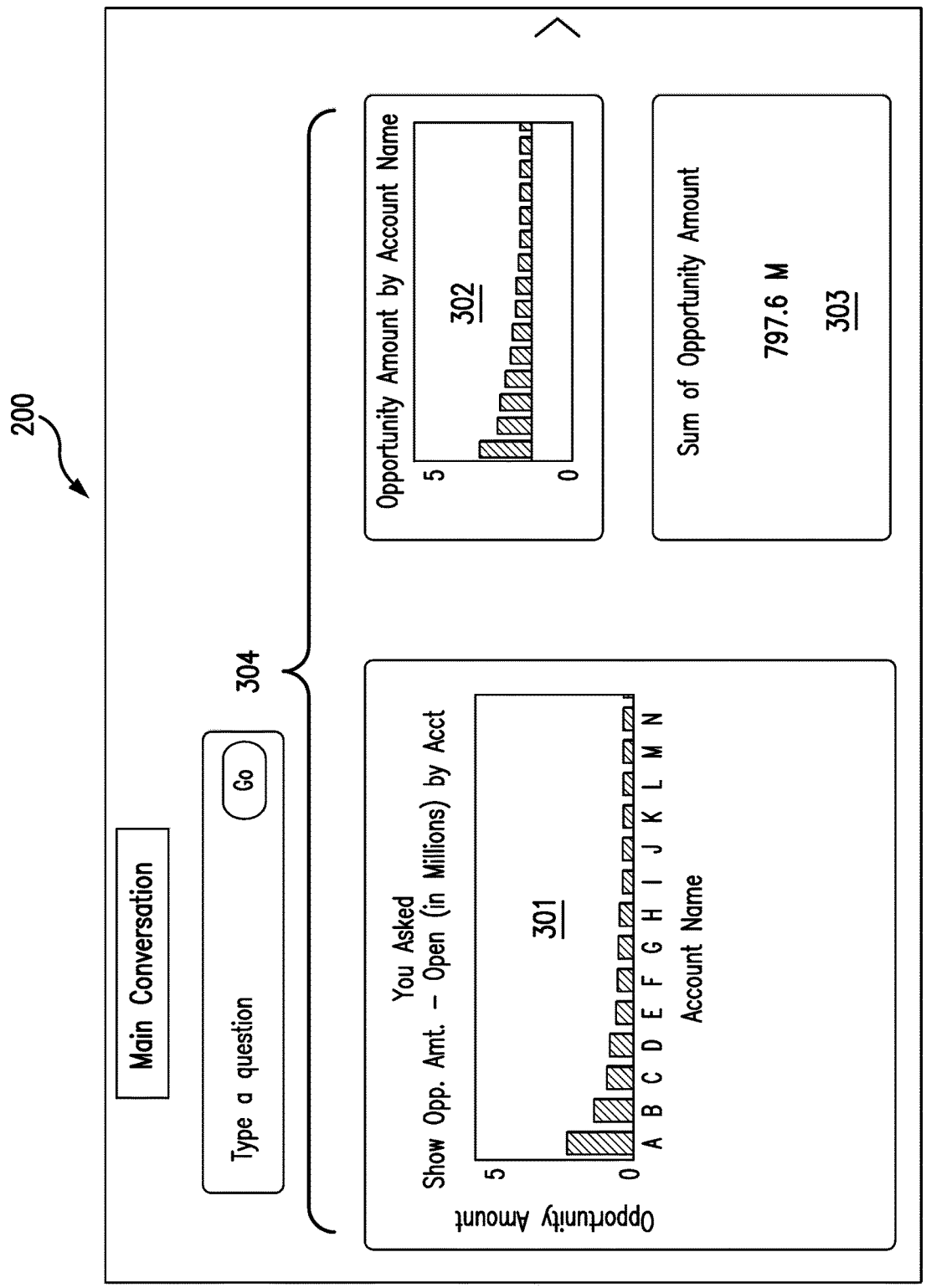
FIG. 3 shows an interface for conversational analytics.

FIG. 3 illustrates an example interface for conversational analytics. As described herein, and illustrated in FIG. 2, a user can conduct a conversation, such as an analytic content discovery conversation, with an interface 200. The interface 200 can provide/present the one or more content items in response to a natural language input. For example, the chart 301 can be visual response to the keyword 201 (FIG. 2). The interface 200 can also present suggestive content 302 and 303 to the user. The suggestive content 302 and 303 can be analytically associated with the chart 301. For example, the chart 301 details "sales opportunity amounts," and the suggestive content 302 and 303 details "opportunity amount by account name," and "sum opportunity amount," respectively. The user can access the chart 301 and/or the suggestive content 302 and 303. An ontology comprising the returned content item (e.g., a response, analytic information, etc.) and/or the plurality of content items (additional content items). The chart 301 and/or the suggestive content 302 and 303 can form an ontology of analytical information. The ontology can be represented as and/or associated with a data structure 304 that correlates a returned content item (the chart 301) and a plurality of content items (the suggestive content 302 and 303) to a natural language input (the keyword 201). For example, the data structure 304 can be a visual representation of the returned content item (the chart 301) and the plurality of content items (the suggestive content 302 and 303). The data structure 304 can be visualized and/or displayed in a manner that illustrates the correlation (e.g., temporal correlation, logical correlation, etc.) between the returned content item (the chart 301) and the plurality of content items (the suggestive content 302 and 303) to the natural language input (the keyword 201). For example, a temporal correlation can be represented by the returned content item (the chart 301) on a left side of the interface 200, and the plurality of content items (the suggestive content 302 and 303) on a right side of the interface 200 to indicate that the returned content item (the chart 301) was determined before the plurality of content items (the suggestive content 302 and 303) were determined. A correlation (e.g., a temporal correlation, a logical correlation, etc.) between a retuned content item and a plurality of content items can be represented in any manner.

Figure 4:
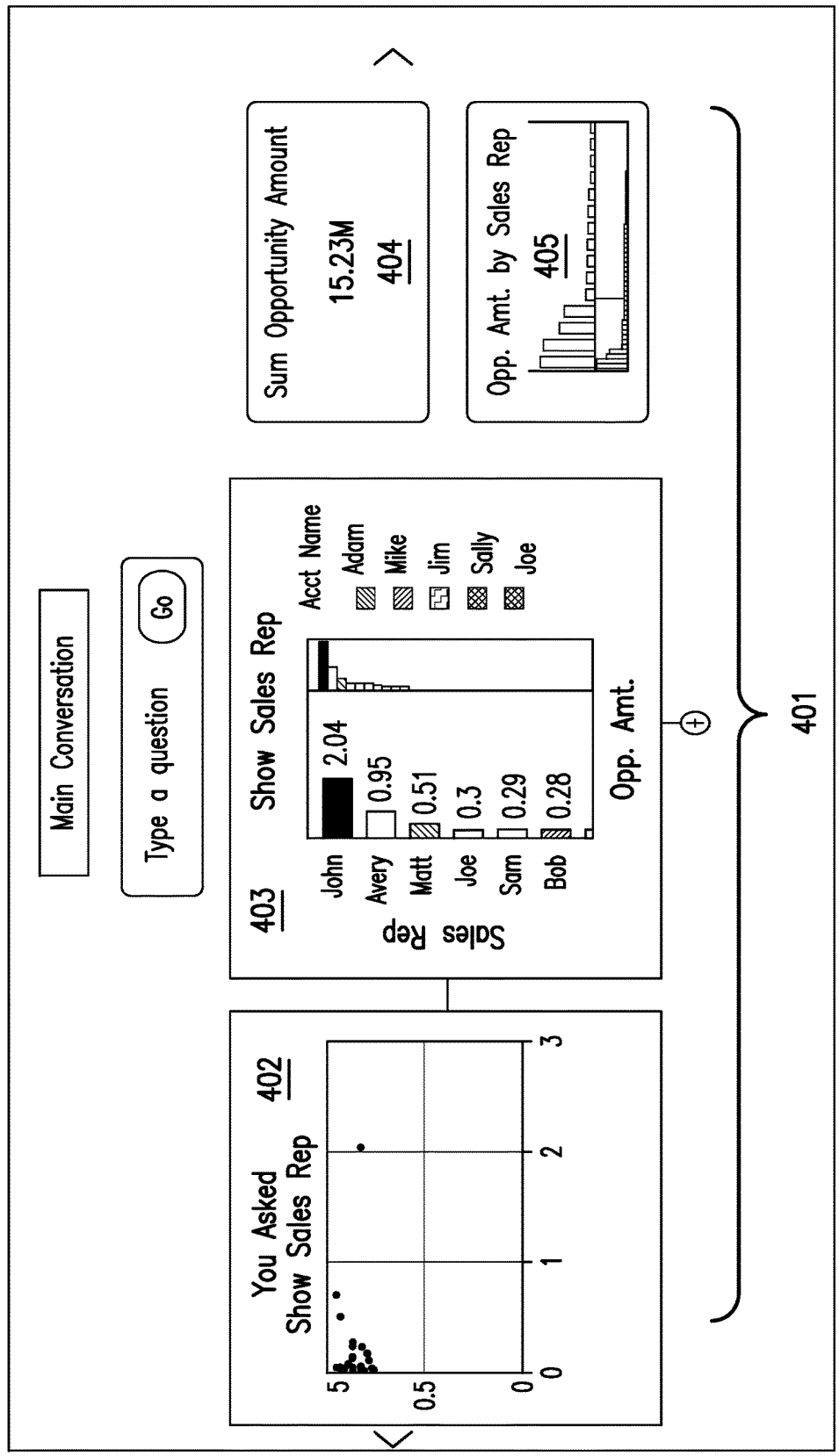
FIG. 4 shows an interface for conversational analytics.

FIG. 4 illustrates an example interface for conversational analytics. Natural language inputs associated with a keyword (the keyword 201) can be processed (e.g., processed by the computing device 104 of FIG. 1), and the interface 200 can generate/present an additional data structure 401. The additional data structure 401 can be a temporal extension, logical extension, analytical extension and/or any other extension of the data structure 304. For example, the user can request content associated with the keyword 201, the returned content item (the chart 301), and/or the plurality of content items (the suggestive content 302 and 303). The additional data structure 401 can comprise content/content items associated with the keyword 201, the returned content item (the chart 301), and/or the plurality of content items (the suggestive content 302 and 303), such as the charts 402, 403, 404, and 404. For example, the charts 402, 403, 404, and 404 each comprise information/data that is analytically associated with the returned content item (the chart 301) and the plurality of content items (the suggestive content 302 and 303) of FIG. 3. The charts 402, 403, 404, and 404, the chart 301, and the suggestive content 302 and 303 each comprise information/data associated with a sales "opportunity amount" (topic 205, FIG. 2), a topic selected by the user.

The data structure 304 and the additional data structure 401 can be stored, displayed, grouped and/or associated with each other based on the keyword 201. The data structure 304 and the additional data structure 401 can be stored, displayed, grouped and/or associated with each other based on a temporal relationship, such as a time of creation, a frequency of occurrence, and/or the like. The data structure 304 and the additional data structure 401 can be stored, displayed, grouped and/or associated with each other based on any relationship, property, or the like. The data structure 304 and the additional data structure 401 can be used to preserve a "train of thought" of the user by enabling the user to visually see different parts of an analytics conversation with the interface 200.

Figure 5:
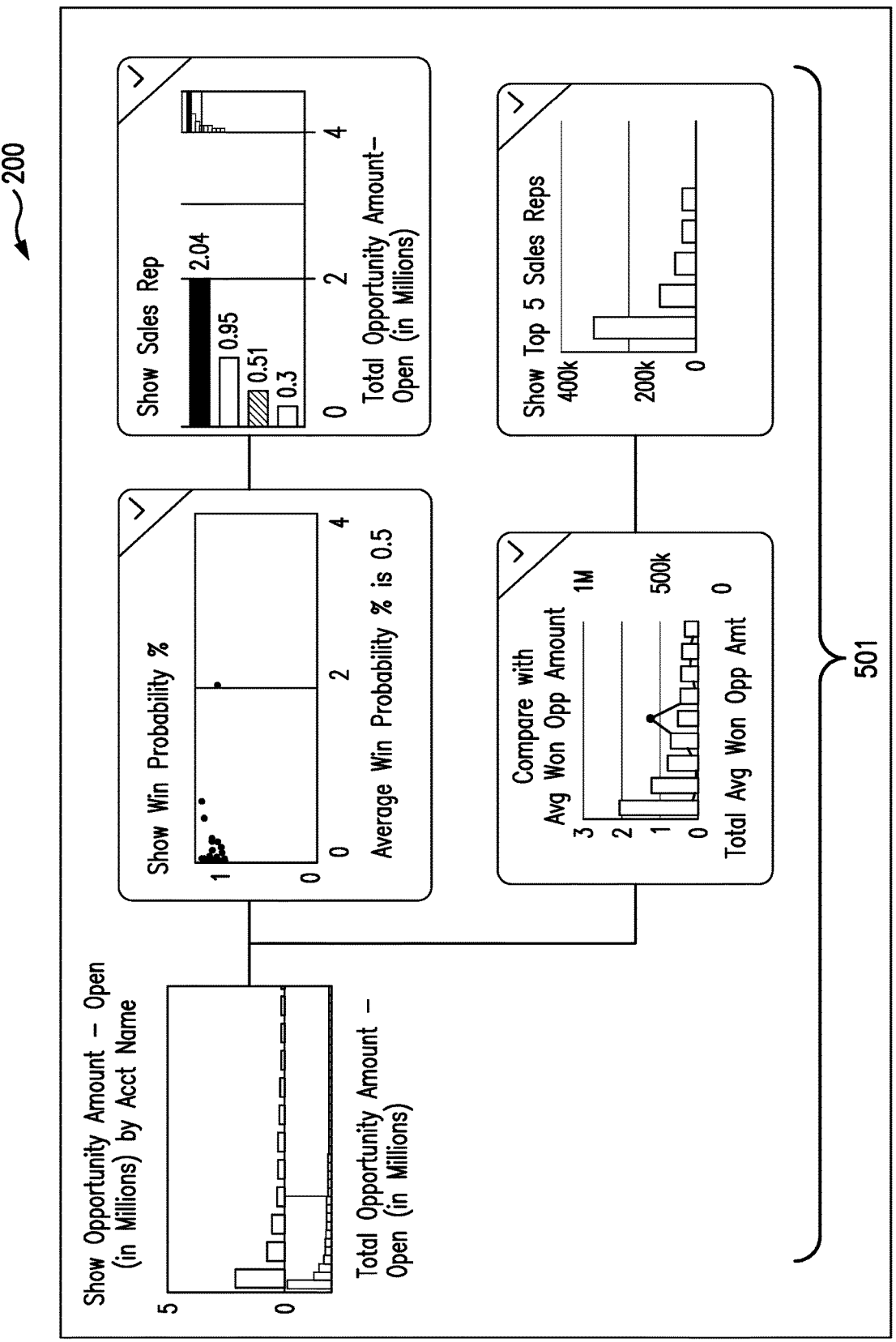
FIG. 5 shows an interface for conversational analytics.

FIG. 5 illustrates an example interface for conversational analytics. Data structures (e.g., the data structure 304, the additional data structure 401, etc.) can be generated based on a natural language input and stored. Stored data structures can be accessed and manipulated by a user. Data structures present and preserve a "train of thought," of a user. Each portion of a data structure can be associated with a "thought" (e.g., natural language input) of the user. Data structure 501 shows a plurality of content items access/determined during an analytics conversation with the interface 200. The data structure 501 (or any other data structure) can be expanded (e.g., associated with additional data structures, etc.), compressed (e.g., only a portion of a data structure displayed, etc.), reduced (e.g., portions of a data structure deleted/removed, etc.), expanded (e.g., associated with additional data structures, etc.). For example, the data structure 501 provides a "canvas" view of an analytics conversation with the interface 200.

Figure 6A:
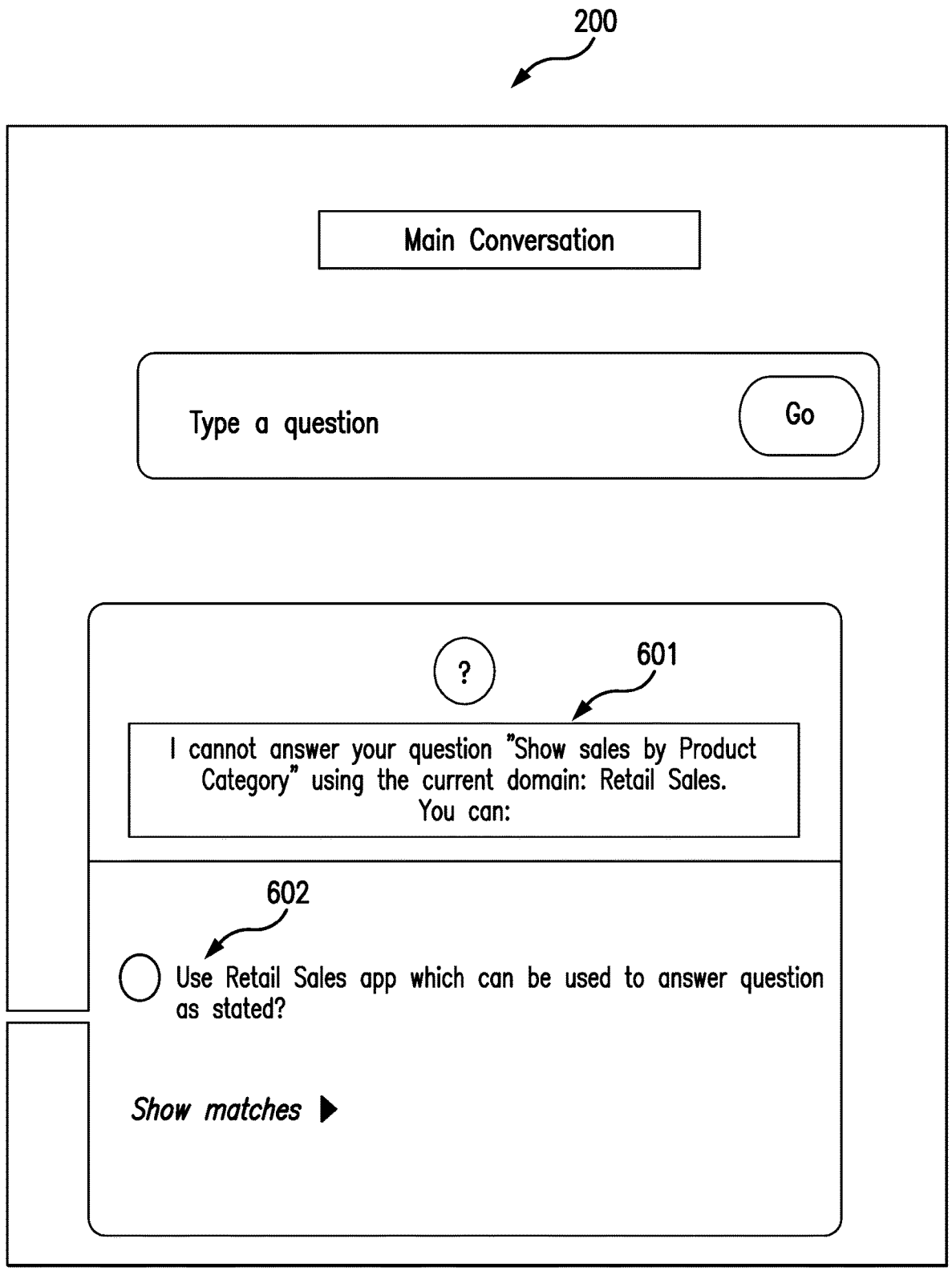
FIG. 6A shows an interface for conversational analytics.
Figure 6B:
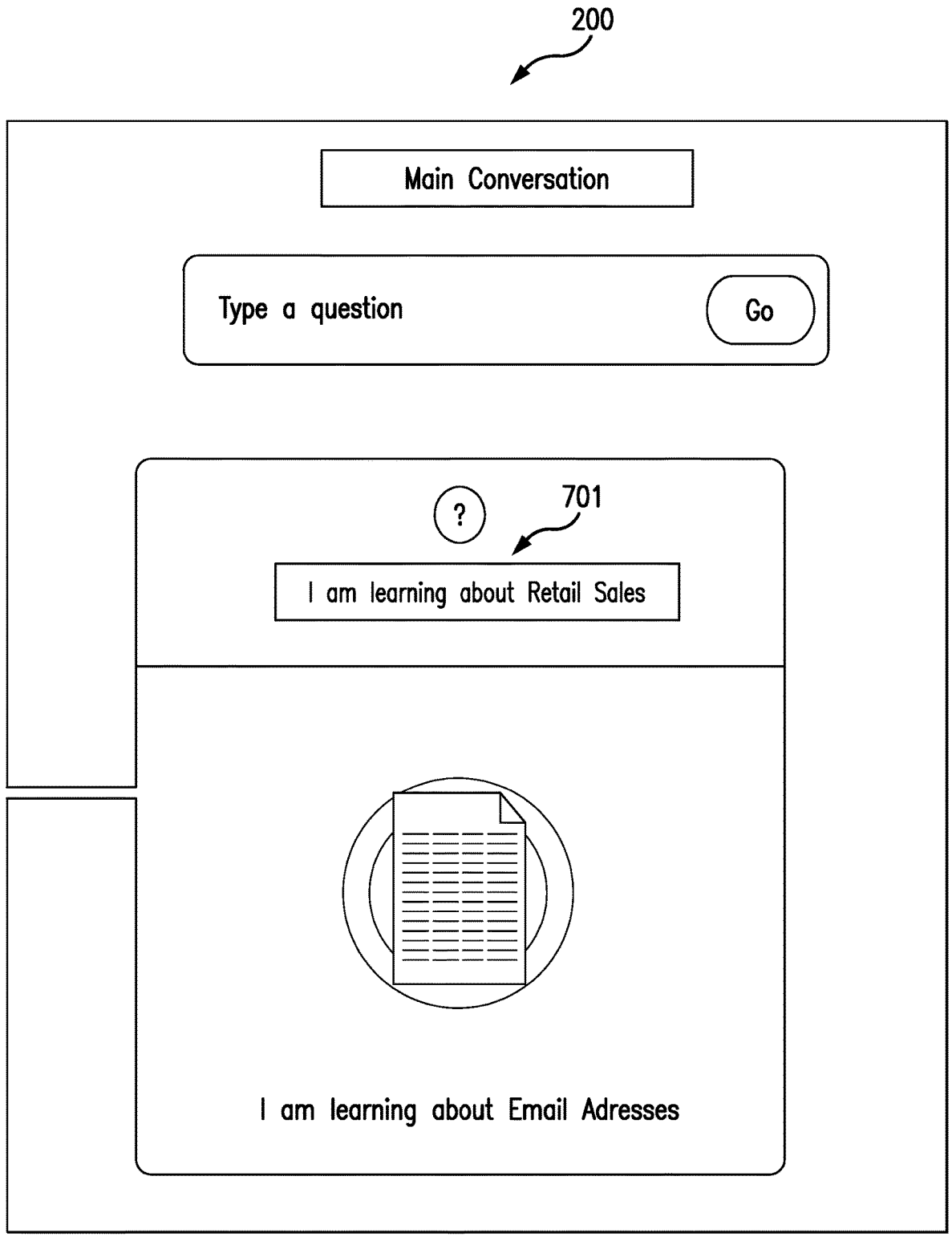
FIG. 6B shows an interface for conversational analytics.

FIG. 6A-6B illustrate an example interface for conversational analytics. Referring to FIG. 6A, a user can conduct a conversation, such as an analytic content discovery conversation, with the interface 200. For example, the user may provide the interface 200 a natural language input, "Show sales by product category." The interface 200 (e.g., the computing device 104, etc.) attempt to provide content (e.g., resultant content, a response, answer, etc.) associated with the natural language input by accessing one or more databases (e.g., the storage module 112, etc.) and/or applications. The interface 200 (e.g., the computing device 104, etc.) determine that content (e.g., resultant content, a response, answer, etc.) requested via the natural language input is unavailable (e.g., not in storage, not configured with an application, etc.) and inform the user at 601. For example, the user can provide a natural language input, "show sales by product category," to the interface 200. The interface 200

(e.g., the computing device 104, etc.) can inform the user at 602 that the content (e.g., resultant content, a response, answer, etc.) is unavailable by generating a natural language output, "I cannot answer your question using the current domain." The interface 102 can suggest 602 one or more content sources (e.g., databases, online sources, business entities, applications, the content device 106, etc.) where the content can be retrieved/requested. Referring to FIG. 6B, at 701 the interface 102 can obtain the content from one or more content sources (e.g., databases, online sources, business entities, applications, the content device 106, etc.).

Figure 7:
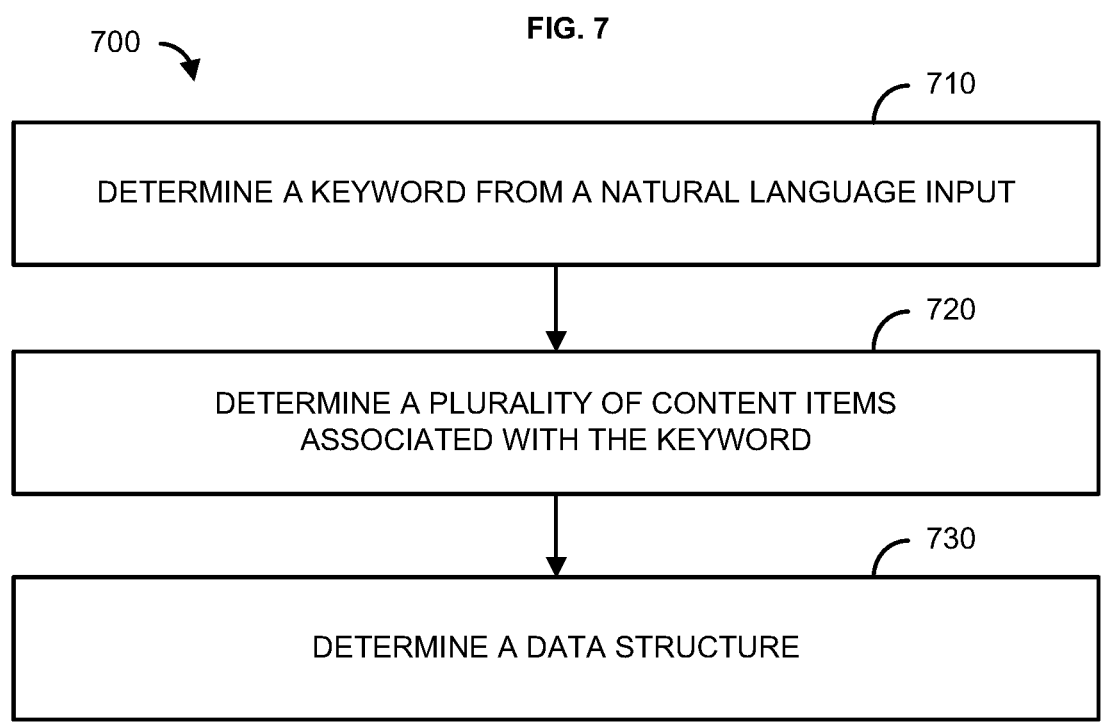
FIG. 7 shows a flowchart of a method for conversational analytics.

FIG. 7 is a flowchart of a method 700 for conversational analytics. At 710 keyword can be determined. The keyword can be determined from a natural language input. A computing device (e.g., the computing device 104, etc.) can determine the keyword. For example, the computing device can process the natural language input by performing speech-to-text operations that translate the natural language input to text, a plurality of characters, and/or the like. For example, a natural language input, "What do you know about sales?" can be converted to text. The text can be parsed to determine the keyword. Syntactic and semantic rules can be applied to the text to determine the keyword. For example, the natural language input, "What do you know about sales," can be parsed to determine the term "sales" as a keyword.

At 720 a plurality of content items can be determined. The computing device can determine the plurality of content items. The computing device can determine synonyms of and terms related to the keyword. For example the computing device can determine a keyword "sales" is associated with the term "leads," "deals," and/or the like. The computing device can access a storage to determine topics frequently associated with the keyword "sales" and/or the related terms term "leads" and "deals," such as, "What is a sales lead," "What is a sales pipeline," "Show me closed deals," and/or the like. The one or more topics frequently associated with the keyword can be provided to the user a natural language output and/or a content items of the plurality of content items. For example, the user can be provided a response of, "I can tell you about leads, sales pipeline, sales opportunities, closed deals and sales targets." The one or more topics frequently associated with the keyword can be provided to the user and the user can select one or more topics for further processing/analysis. Each topic of the one or more topics and/or keyword synonym (e.g., leads, sales pipeline, sales opportunities, closed deals, target sales, etc.) can be associated with a content item of the plurality of content items. The plurality of content items can comprise analytic information, such as charts, graphs, business centric information, data correlations, and/or the like. The plurality of content items can be requested and or retrieved from one or more content source. For example, the computing device can communicate with one or more content sources to request/retrieve content/content items associated with the keyword.

At 730 a data structure can be determined. The computing device can determine the data structure. The data structure can comprise the plurality of content items. The computing device can generate an ontology based on the data structure that comprises the plurality of content items associated with each other based on a temporal value. A temporal value can be associated with each content item of the plurality of content items based on a time that a respective content item was requested/retrieved and/or determined. The data structure can correlate the each content item of the plurality of content items to the keyword. The data structure can be visualized and/or displayed in a manner that illustrates the correlation (e.g., temporal value, analytical/logical correlation, etc.) between each content item of the plurality of content items to the keyword.

The data structure can be stored. The data structure can be expanded (e.g., associated with additional data structures, etc.), compressed (e.g., only a portion of a data structure displayed, etc.), reduced (e.g., portions of a data structure deleted/removed, etc.), expanded (e.g., associated with additional data structures, etc.). For example, the computing device can received additional natural language inputs the computing device can process each additional natural language input to determine a respective keyword. Each keyword can be correlated to the keyword determined from the natural language input received by the computing device.

Figure 8:
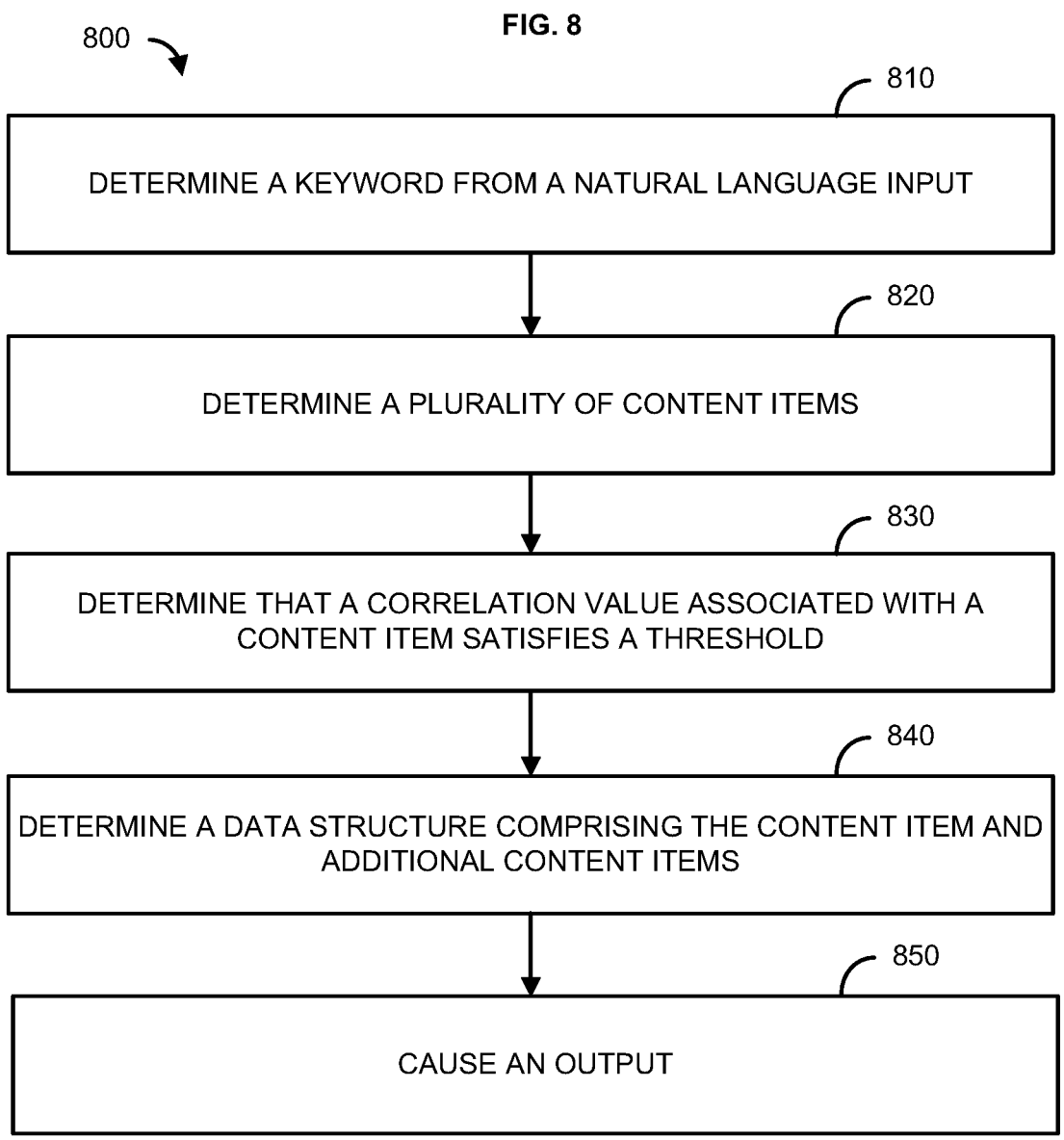
FIG. 8 shows a flowchart of a method for conversational analytics.

FIG. 8 is a flowchart of a method 800 for conversational analytics. At 810 keyword can be determined. The keyword can be determined from a natural language input. A computing device (e.g., the computing device 104, etc.) can determine the keyword. For example, the computing device can process the natural language input by performing speech-to-text operations that translate the natural language input to text, a plurality of characters, and/or the like. For example, a natural language input, "What do you know about sales?" can be converted to text. The text can be parsed to determine the keyword. Syntactic and semantic rules can be applied to the text to determine the keyword. For example, the natural language input, "What do you know about sales," can be parsed to determine the term "sales" as a keyword.

At 820 a plurality of content items can be determined. The computing device can determine the plurality of content items. The computing device can determine synonyms of and terms related to the keyword. For example the computing device can determine a keyword "sales" is associated with the term "leads," "deals," and/or the like. The computing device can access a storage to determine topics frequently associated with the keyword "sales" and/or the related terms term "leads" and "deals," such as, "What is a sales lead," "What is a sales pipeline," "Show me closed deals," and/or the like. The one or more topics frequently associated with the keyword can be provided to the user a natural language output and/or a content items of the plurality of content items. For example, the user can be provided a response of, "I can tell you about leads, sales pipeline, sales opportunities, closed deals and sales targets." The one or more topics frequently associated with the keyword can be provided to the user and the user can select one or more topics for further processing/analysis. Each topic of the one or more topics and/or keyword synonym (e.g., leads, sales pipeline, sales opportunities, closed deals, target sales, etc.) can be associated with a content item of the plurality of content items. The plurality of content items can comprise analytic information, such as charts, graphs, business centric information, data correlations, and/or the like. The plurality of content items can be requested and or retrieved from one or more content source. For example, the computing device can communicate with one or more content sources to request/retrieve content/content items associated with the keyword. The plurality of content items can be associated with a correlation value. The correlation value can indicate an amount of data/information associated with the keyword. For example a keyword "sales" can yield a content item such as a chart that details "sales in region" or a graph that details or sales by a particular sales representative. The chart and the graph can both contain information about "sales." However, if the graph comprises information for a current year, or a particular region, and the keyword is being provided to the computing device during the current year, then a correlation value can be assigned to the graph that is greater than the chart because the graph and keyword are both associated with the current year. The chart can be associated with a lower correlation value because, although it contain data/information regarding sales, it is not associated with the current year. A correlation value for a content item can be determined based on any property of a content item.

At 830 a content item of the plurality of content items can be associated with a correlation value that satisfies a threshold. For example a threshold can indicate that only content items with certain correlation value are relevant to the keyword.

At 840, a data structure can be generated. The data structure can comprise the content item of the plurality of content items. The data structure can be part of an ontology that correlates content items to the natural language input. The data structure can be displayed/visualized.

At 850, causing an output comprising the at least one content item and the one or more content items. The computing device can cause the output. The output can be a natural language output. For example, a natural language input, "what do you know about sales," can yield a natural language output, "I can tell you about leads, sales pipeline, sales opportunities, closed deals and sales targets." The content item associated with the correlation value that satisfied the threshold can comprise information regarding leads, sales pipeline, sales opportunities, closed deals and sales targets, and the like.

Figure 9:
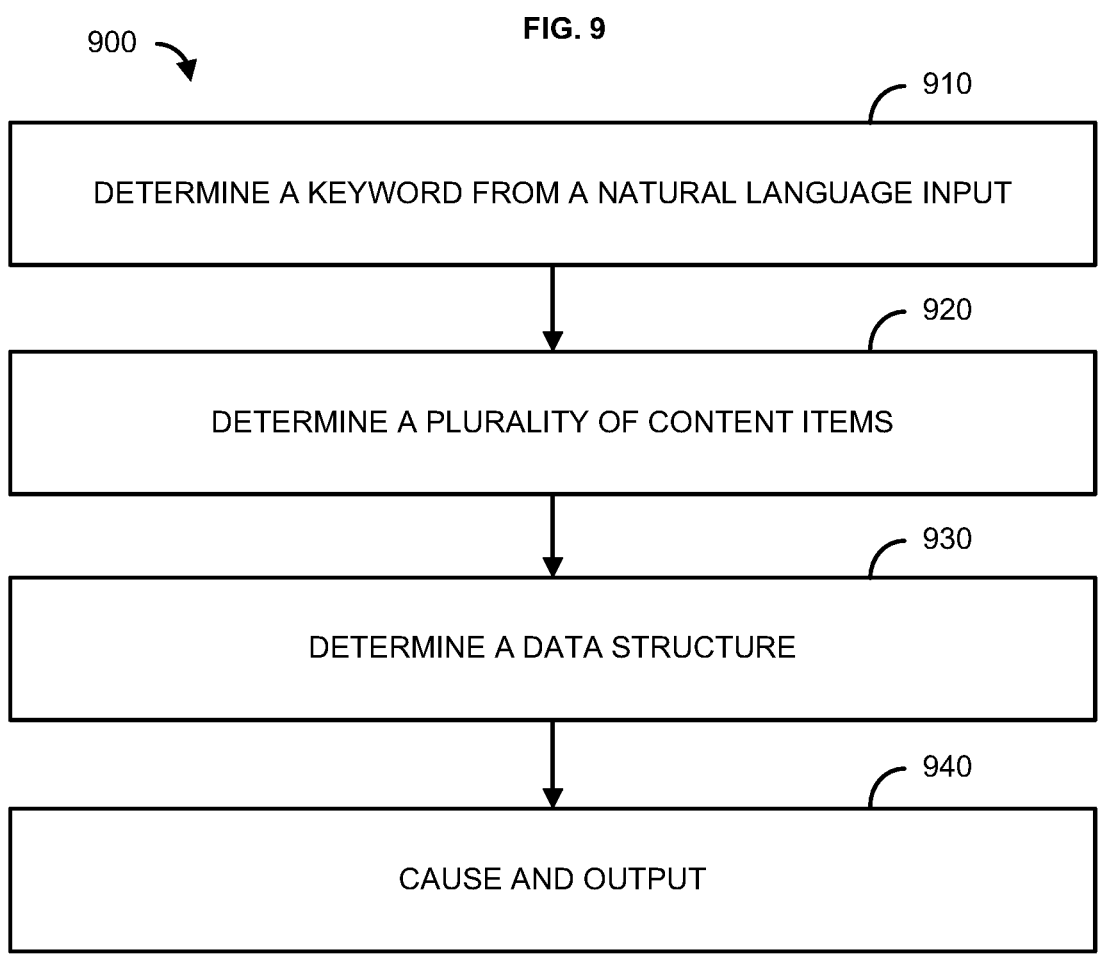
FIG. 9 shows a flowchart of a method for conversational analytics.

FIG. 9 is a flowchart of a method 900 for conversational analytics. At 910 keyword can be determined. The keyword can be determined from a natural language input. A computing device (e.g., the computing device 104, etc.) can determine the keyword. For example, the computing device can process the natural language input by performing speech-to-text operations that translate the natural language input to text, a plurality of characters, and/or the like. For example, a natural language input, "What do you know about sales?" can be converted to text. The text can be parsed to determine the keyword. Syntactic and semantic rules can be applied to the text to determine the keyword. For example, the natural language input, "What do you know about sales," can be parsed to determine the term "sales" as a keyword.

At 920 a plurality of content items can be determined. The computing device can determine the plurality of content items. The computing device can determine synonyms of and terms related to the keyword. For example the computing device can determine a keyword "sales" is associated with the term "leads," "deals," and/or the like. The computing device can determine topics associated with a previous natural language input is associated with the keyword. The computing device can access a storage to determine topics frequently associated with the keyword "sales" and/or the related terms term "leads" and "deals," such as, "What is a sales lead," "What is a sales pipeline," "Show me closed deals," and/or the like. The one or more topics frequently associated with the keyword can be provided to the user a natural language output and/or a content items of the plurality of content items. For example, the user can be provided a response of, "I can tell you about leads, sales pipeline, sales opportunities, closed deals and sales targets."

At 930, a data structure can be determined. The computing device can determine the data structure. The data structure can be determined based on a selection of a content item (e.g., one or more topics frequently associated with the keyword). For example, the one or more topics frequently associated with the keyword can be provided to the user and the user can select one or more topics for further processing/analysis. Each topic of the one or more topics and/or keyword synonym (e.g., leads, sales pipeline, sales opportunities, closed deals, target sales, etc.) can be associated with a content item of the plurality of content items. The plurality of content items can comprise analytic information, such as charts, graphs, business centric information, data correlations, and/or the like. The data structure can be a visual representation of the selected topic. The data structure can comprise additional content items. The additional content items can be associated with the selected content item. For example, the user can select a topic about sales for a business region. The additional content items can be one or more charts or graphs that comprise sales broken down by sales representative in a business region. The additional content items can be associated with the topic based on any attribute and/or property.

At 940, the additional content items can be output. The computing device can output the additional content items as a natural language output. For example, the output can be "I can also tell you about sales by sales representative for the business region."

Figure 10:
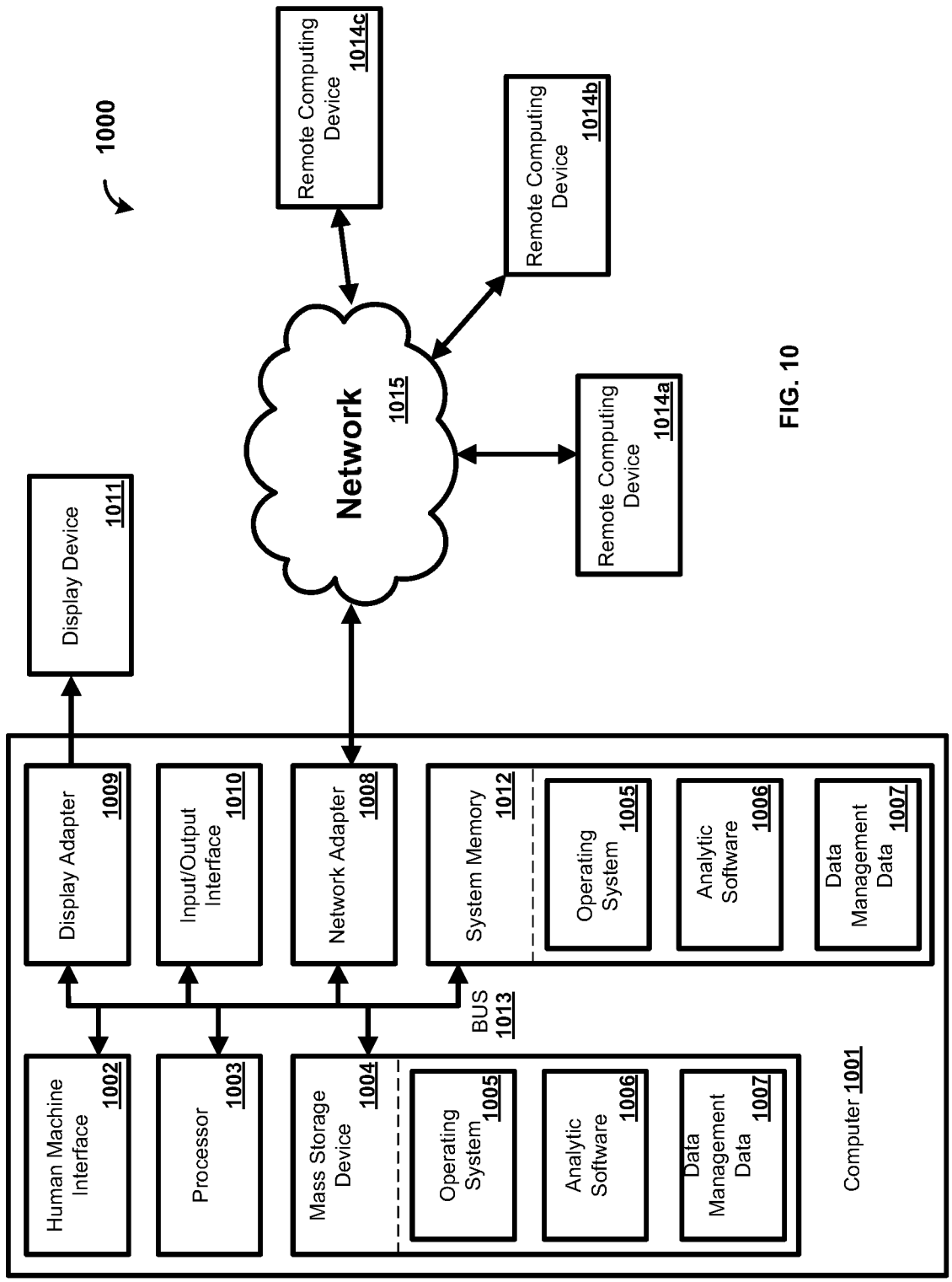
FIG. 10 shows a block diagram of a computing device for implementing conversational analytics.

FIG. 10 shows a system 1000 for conversational analytics. The computing device 104, or the content device 106 of FIG. 1 may be a computer 1001 as shown in FIG. 10. The computer 1001 may comprise one or more processors 1003, a system memory 1012, and a bus 1013 that couples various components of the computer 1001 including the one or more processors 1003 to the system memory 1012. In the case of multiple processors 1003, the computer 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computer 1001 may operate on and/or comprise a variety of computer readable media (e.g., non-transitory). Computer readable media may be any available media that is accessible by the computer 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as analytic data 1007 and/or program modules such as operating system 1005 and analytic software 1006 that are accessible to and/or are operated on by the one or more processors 1003.

The computer 1001 may also comprise other removable/non-removable, volatile/non-volatile computer storage media. The mass storage device 1004 may provide non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and analytic software 1006 may be stored on the mass storage device 1004. One or more of the operating system 1005 and analytic software 1006 (or some combination thereof) may comprise program modules and the analytic software 1006. Analytic data 1007 may also be stored on the mass storage device 1004. Analytic data 1007 may be stored in any of one or more databases known in the art. The databases may be centralized or distributed across multiple locations within the network 1015.

A user may enter commands and information into the computer 1001 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 via an interface, such as a display adapter 1009. It is contemplated that the computer 1001 may have more than one display adapter 1009 and the computer 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computer 1001 via Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computer 1001 may be part of one device, or separate devices.

The computer 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1001 and a remote computing device 1014a,b,c may be made via a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components may reside at various times in different storage components of the computing device 1001, and are executed by the one or more processors 1003 of the computer 1001. An implementation of analytic software 1006 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    determining, by a computing device, based on a first natural language input received via a user interface during an analytics session, a keyword, wherein the first natural language input comprises the keyword;
    generating, during the analytics session, at least one first content items comprising analytic content associated with the keyword;
    generating, based on the first natural language input and the at least one first content item, a first data structure, wherein the first data structure associates the keyword and the at least one first content item with a first temporal value that is based on a time the at least one first content item was generated during the analytics session;
    generating, based on a second natural language input associated with the first natural language input, a second data structure, wherein the second data structure associates the keyword and at least one second content item, comprising analytic content associated with the keyword, with a second temporal value that is based on a time the at least one second content item was generated during the analytics session, and wherein the second natural language input excludes the keyword; and
    causing, based on the first data structure and the second data structure, the at least one first content item and the at least one second content item to be output at the user interface, wherein the output comprises a chronological arrangement of the at least one first content item and the at least one second content item based on the first temporal value and the second temporal value.

2. The method of claim 1, further comprising receiving the second natural language input.

3. The method of claim 2, further comprising:
- determining that a correlation between the second natural language input and the at least one second content item exists; and
- causing, based on the correlation, an output of the at least one second content item.

4. The method of claim 3, wherein receiving the second natural language input is based on a recommendation.

5. The method of claim 4, wherein the recommendation comprises natural language that is output via the user interface.

6. The method of claim 1, further comprising receiving, via the user interface, the first natural language input during the analytics session.

7. The method of claim 1, wherein the analytic content comprises one or more of a chart or a graph associated with the keyword.

8. A method comprising:
- determining, by a computing device, based on a first natural language input received via a user interface during an analytics session, a keyword, wherein the first natural language input comprises the keyword;
- generating, during the analytics session, at least one first content items associated with a first correlation value that indicates an amount of data associated with the keyword;
- generating, based on the first natural language input and the at least one first content item, a first data structure, wherein the first data structure associates the keyword and the at least one first content item with the first correlation value;
- generating, based on a second natural language input associated with the first natural language input, a second data structure, wherein the second data structure associates the keyword and at least one second content item with a second correlation value, and wherein the second natural language input excludes the keyword; and
- causing, based on the first data structure and the second data structure, the at least one first content item and the at least one second content item to be output at the user interface, wherein the output comprises an ordered arrangement of the at least one first content item and the at least one second content item based on the first correlation value and the second correlation value.

9. The method of claim 8, further comprising receiving the second natural language input.

10. The method of claim 9, further comprising:
- determining that a correlation between the second natural language input and the at least one second content item exists.

11. The method of claim 10, wherein receiving the second natural language input is based on a recommendation.

12. The method of claim 10, further comprising causing output of at least one of: the at least one first content item or the at least one second content item at the user interface.

13. The method of claim 10, wherein the at least one first content item comprises a chart or a graph associated with the keyword.

14. An apparatus comprising:
- one or more processors; and
- memory storing processor-executable instructions that, when executed by the one or more processors, cause the apparatus to:
- determine, by a computing device, based on a first natural language input received via a user interface during an analytics session, a keyword, wherein the first natural language input comprises the keyword;
- generate, during the analytics session, at least one first content items comprising analytic content associated with the keyword;
- generate, based on the first natural language input and the at least one first content item, a first data structure, wherein the first data structure associates the keyword and the at least one first content item with a first temporal value that is based on a time the at least one first content item was generated during the analytics session;
- generate, based on a second natural language input associated with the first natural language input, a second data structure, wherein the second data structure associates the keyword and at least one second content item, comprising analytic content associated with the keyword, with a second temporal value that is based on a time the at least one second content item was generated during the analytics session, and wherein the second natural language input excludes the keyword; and
- cause, based on the first data structure and the second data structure, the at least one first content item and the at least one second content item to be output at the user interface, wherein the output comprises a chronological arrangement of the at least one first content item and the at least one second content item based on the first temporal value and the second temporal value.

15. The apparatus of claim 14, wherein the processor-executable instructions further cause the apparatus to receive the second natural language input.

16. The apparatus of claim 15, wherein the processor-executable instructions further cause the apparatus to:
- determine that a correlation between the second natural language input and the at least one second content item exists.

17. The apparatus of claim 15, wherein the second natural language input is received based on a recommendation.

18. The apparatus of claim 17, wherein the recommendation comprises natural language that is output via the user interface.

19. The apparatus of claim 14, wherein the analytic content comprises one or more of a chart or a graph associated with the keyword.

20. The apparatus of claim 14, wherein the processor-executable instructions further cause the apparatus to receive, via the user interface, the first natural language input during the analytics session.

* * * * *